US007836269B2

United States Patent
Obereiner et al.

(10) Patent No.: US 7,836,269 B2
(45) Date of Patent: Nov. 16, 2010

(54) SYSTEMS AND METHODS FOR ACCESS VIOLATION MANAGEMENT OF SECURED MEMORY

(75) Inventors: Willy Obereiner, San Jose, CA (US); Venkat Natarajan, Cupertino, CA (US); Jeremy Isaac Nathaniel Werner, San Jose, CA (US); Joe Yuen Tom, Foster City, CA (US); Hyun Soo Lee, Ithaca, NY (US)

(73) Assignee: Spansion LLC, Sunnyvale, CA (US)

( * ) Notice: Subject to any disclaimer, the term of this patent is extended or adjusted under 35 U.S.C. 154(b) by 714 days.

(21) Appl. No.: 11/618,075

(22) Filed: Dec. 29, 2006

(65) Prior Publication Data

US 2008/0162784 A1 Jul. 3, 2008

(51) Int. Cl.
*G06F 13/16* (2006.01)

(52) U.S. Cl. ............... 711/163; 711/103; 711/E12.093; 711/E12.008; 710/5; 713/193

(58) Field of Classification Search ............... 711/103, 711/163; 710/5
See application file for complete search history.

(56) References Cited

U.S. PATENT DOCUMENTS

2003/0099231 A1* 5/2003 Betts et al. ............... 370/369

2007/0245036 A1* 10/2007 Fekih-Romdhane ............ 710/5
2007/0260836 A1* 11/2007 Rudelic ..................... 711/163
2008/0126813 A1* 5/2008 Kawakami ................. 713/193

* cited by examiner

Primary Examiner—Yong Choe
(74) Attorney, Agent, or Firm—Turocy & Watson, LLP

(57) ABSTRACT

Systems and methods that facilitate processing data and securing data written to or read from memory. A processor can include a host memory interface that monitors all bus traffic between a host processor and memory. The host memory interface can analyze commands generated by the host processor and determine the validity of the commands. Valid commands can proceed for further analysis; invalid commands can be aborted, for example, with the host memory interface and memory each set to an idle state. The host memory interface can analyze authentication information obtained via an authentication component, and information regarding memory partition rights, to determine whether a command partition violation exists as to the command. If a violation exists, the host memory interface can prevent the improper command from executing in the memory, and can cause a different operation to occur thereby allowing the memory to be placed in a known state.

14 Claims, 11 Drawing Sheets

SYSTEMS AND METHODS FOR ACCESS VIOLATION MANAGEMENT OF SECURED MEMORY

TECHNICAL FIELD

The present invention relates generally to memory systems and in particular to systems and methods for managing illegal commands to a secured memory.

BACKGROUND

With many electronic products, security of the data written to and read from memory is important. Examples of such products include portable devices such as cell phones, portable computers, voice recorders, and the like, as well as many larger electronic systems that are utilized in cars, planes, and industrial control systems. To improve security, a processor may be used to encrypt and decrypt data being transferred to and from memory. Further, in order to prevent unauthorized entities from accessing secured information, authentication may be required of an entity in order for the entity to gain access to the secured memory.

At times, either unintentionally or intentionally, such as with persons who may attempt to hack into a secured device, illegal or invalid commands may be sent to execute in the memory, and if executed, could corrupt secured data stored in the memory. Further, commands made by an entity that has not been granted access rights to the memory, or a partition thereof, may result in personal and sensitive information of the device owner being accessed and viewed by an unauthorized entity. As a result, there is a need for improved protection of data in a secured memory, particularly with regard to portable electronic devices.

SUMMARY

The following presents a simplified summary of the innovation in order to provide a basic understanding of some aspects described herein. This summary is not an extensive overview of the claimed subject matter. It is intended to neither identify key or critical elements of the disclosed subject matter nor delineate the scope of the subject innovation. Its sole purpose is to present some concepts of the claimed subject matter in a simplified form as a prelude to the more detailed description that is presented later.

In one aspect of the disclosed subject matter, a host processor that can be operatively coupled to a security processor and memory in a series connection so software, such as security software, and data, such as secured data. The security processor can encrypt information being written to memory and decrypt information being retrieved from memory. The security processor can also include a host memory interface (I/F) that can monitor information being communicated from the host processor to the memory. For example, the host memory I/F can monitor whether a command, such as a write command or a program erase command, is valid or illegal. If the command is illegal, the host memory I/F and memory can both go to an idle state and the illegal command is prevented from executing. If the command is valid, then the host memory I/F can also monitor to see which memory location the command is attempting to execute an operation in order to determine whether the command is directed to a partition in the memory that the command is permitted to access. If the command is to a partition to which the command is permitted access, that is, if proper authentication has been presented with regard to that memory partition, the command can be executed. If the command is to a memory partition to which access rights have not been granted, then the host memory I/F can see that there is a command partition violation, and the host memory I/F can act accordingly to prevent the operation associated with the command from executing. At the same time, to ensure that the memory and other components continue to operate smoothly, the host memory I/F can cause replacement data to be sent to the memory location in the partition, where the data can be such that the information at that memory location will not be affected.

In another aspect of the disclosed subject matter, the security processor can further include an authentication component that can require that a user authenticate via a password or biometric modality (e.g., face recognition), for example, to demonstrate that the user has authority to access such secured data. The authentication component can be associated with the host memory I/F, so that the host memory I/F can be aware of whether a particular partition is "open" or "closed" and can use that information to determine whether a command can properly be executed, such as when the partition is "open," or whether the command should be prevented from executing, such as when the partition the command is attempting to access is "closed" or "locked."

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
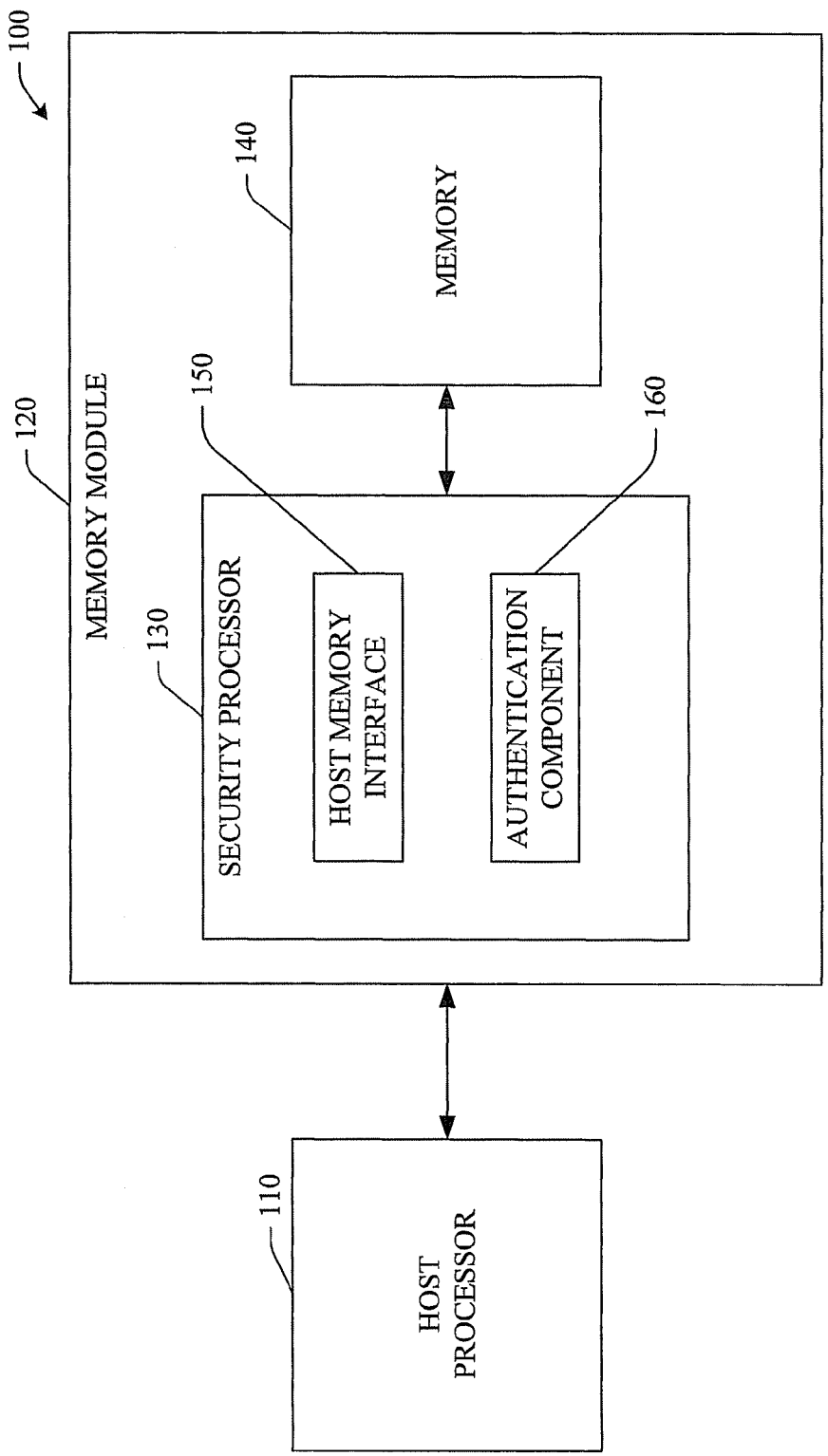
FIG. 1 illustrates a system that facilitates security of data in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

With many electronic products, security of the data written to and read from memory is important. At times, either unintentionally or intentionally, such as with persons who may attempt to hack into a device, illegal or invalid commands may be sent to be executed in the memory, and if executed, could corrupt secure data stored in the memory. Further, commands made by an entity that has not been granted certain access rights to the memory, or a partition thereof, may result in personal and/or sensitive information of the content owner being accessed, viewed, copied, and/or overwritten by an unauthorized entity. As a result, there is a need for improved protection of data in memory to ensure that illegal or improper commands are not executed in the memory.

A host processor can be operatively coupled to a security processor and memory in a series connection to facilitate integrated security capabilities, for example. The memory can store software, such as security software, and data, such as secured data. The security processor can include a host memory I/F that can monitor information being communicated from a host processor to a memory. For example, the host memory I/F can monitor whether a command, such as a read, write, program, or erase command, is valid or illegal. If the command is illegal, the host memory I/F can abort the operation associated with the command and prevent the command from executing, and the host memory I/F and memory can both go to an idle state. If the command is valid, then the host memory I/F can also monitor to see which memory location the command is directed to in order to determine whether certain access rights have been granted with regard to the memory partition in which the memory location resides, and thereby determine whether the command may properly access that partition. If the command is to a partition to which the command is permitted access, that is, if proper authentication has been presented with regard to that memory partition, the command can be executed. If the command is to a memory partition to which access rights have not been granted, then the host memory I/F can see that there is a command partition violation, and the host memory I/F can act accordingly to prevent the operation associated with the command from executing. At the same time, to ensure that the memory and other components continue to operate smoothly, the host memory I/F can generate a different and unique command resulting in a different operation being performed. For example, the host memory I/F can cause replacement data to be sent to the memory location in the partition, where the data can be such that the information in that memory location will not be affected.

Now turning to FIG. 1, a system 100 that facilitates security of data is illustrated. The system 100 can include a host processor 110, which can be a typical applications processor that can manage communications and run applications. The host processor 110 can be a baseband processor for a mobile handset, personal data assistant (PDA), or the like. The host processor 110 can be associated with a memory module 120 that can include a security processor 130 that facilitates securing data being written to and read from memory 140. In another aspect of the claimed subject matter, the memory module 120, including the security processor 130 and memory 140, can be situated on a single chip, for example. Further, it should be understood that there can be more than one memory module 120, although only one memory module 120 is shown in FIG. 1. The memory module 120 can be configured such that the host processor 110 can be connected in series with the security processor 130 positioned between the host processor 110 and the memory 140 via a split or shared bus to facilitate integrated security capabilities and efficiency. It is to be appreciated that, while the host processor 110, security processor 130, and memory 140 are configured in series, the claimed subject matter is not so limited and can be configured in any way that can facilitate the processing of data as claimed and disclosed herein.

The memory 140 can include volatile memory (e.g, random access memory (RAM), static RAM (SRAM), and the like) and non-volatile memory (e.g., read only memory (ROM), programmable ROM (PROM), flash, and the like). The memory 140 can include distinct memory addresses to which data can be stored. The memory 140 can also be partitioned into two or more partitions, which can be utilized to provide varying levels of security, for example. The partitions can be dynamic, as the partitions can either be fixed or programmable at run time. Further, the host processor 110 and security processor 130 can each know the memory addresses associated with respective partitions, so that they will know which partition is being accessed based on the specified memory address.

The security processor 130 can include a host memory I/F 150 capable of monitoring commands coming into the security processor from the host processor 110, for example, to provide additional security capabilities. In one aspect of the disclosed subject matter, the host memory I/F 150 can monitor whether a command, such as a read, write, program, or erase command, is valid or illegal. If the command is illegal or invalid, the host memory I/F 150 can abort the command and prevent the command from executing in the memory. Further, the host memory I/F 150 and the memory 140 can each revert to an idle state, so that they remain in corresponding states and work in sequence together. Alternatively, the illegal or invalid command can be prevented by locking out the memory 140 until it (with or without the security processor 130) has gone through a power off/on cycle. If the command is valid, the host memory I/F 150 can also monitor the command to see whether the command is directed to a memory location in the memory 140 to which the command is permitted to have access.

To accomplish this, the security processor 130 can also employ an authentication component 160 that can receive and retrieve credential information (e.g., biometric information and/or password information) associated with an entity attempting to access one or more memory partitions. The authentication information can be used to determine which memory partitions, and thus, which memory addresses, in the memory 140 that the entity has authority to access.

If the command is to a partition to which the command is permitted access, that is, if proper authentication has been presented with regard to that memory partition, the partition will be "open" and the command can be executed. If the command is to a memory partition to which access rights have not been granted, that partition will be "closed" or "locked" and the host memory I/F 150 can see that there is a command partition violation. The host memory I/F 150 can then act accordingly to prevent the operation associated with the command from executing in the memory 140. At the same time, to ensure that the memory 140 and other components continue to operate smoothly, the host memory I/F 150 can perform a different operation, such as, for example, sending replacement data to the memory location in the partition, where the data can be such that the information in that memory location, as well as information in any other memory location (e.g., memory array, register), is not affected.

Figure 2:
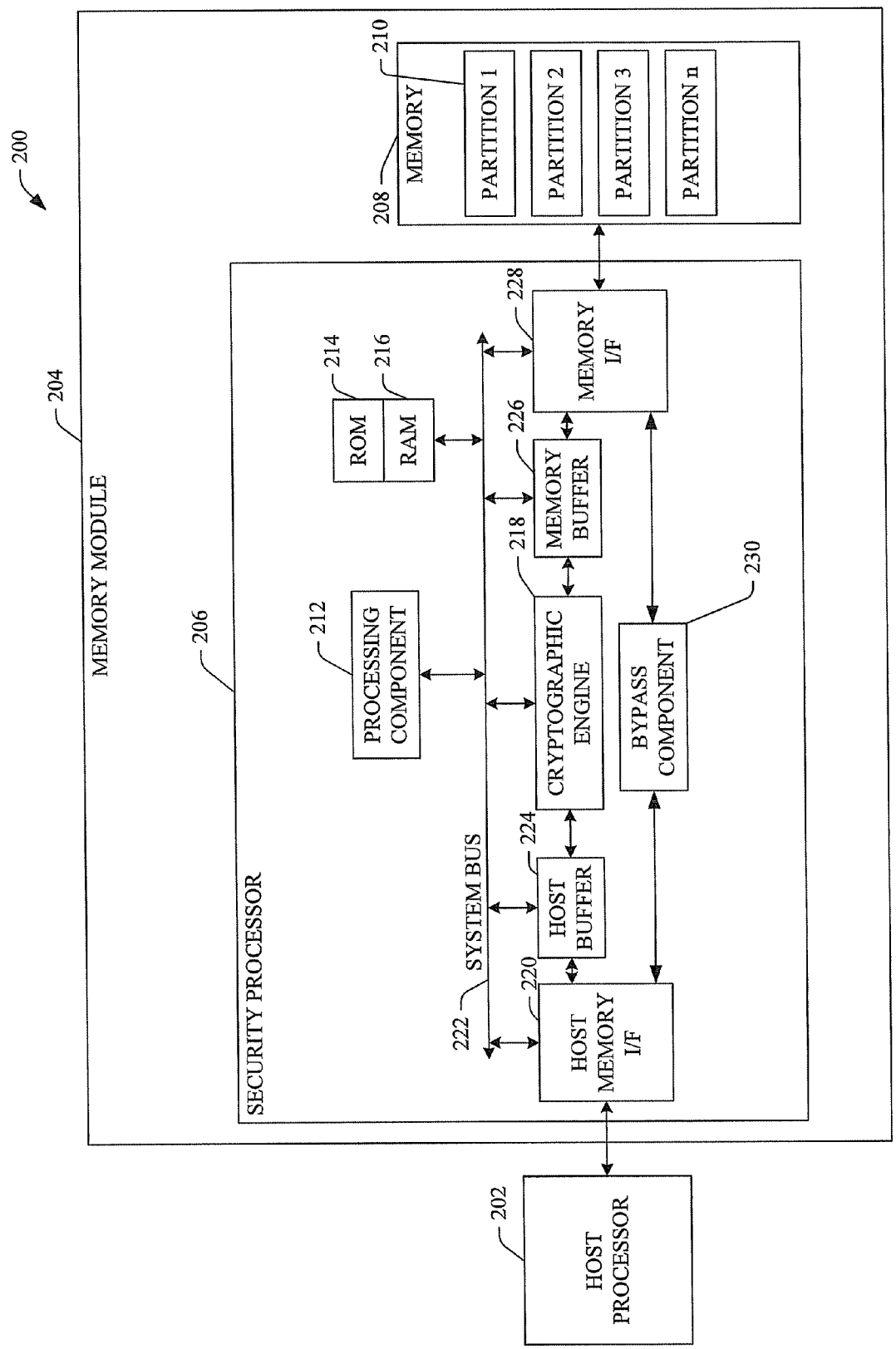
FIG. 2 provides a more detailed depiction of a system that facilitates security of data in accordance with an aspect of the subject matter disclosed herein.

In more detail, FIG. 2 illustrates a system 200 that facilitates security of data. The system 200 can include a host processor 202, which can be a typical applications processor that handles communications and runs applications. The host processor 202 can be a baseband processor for a mobile handset, PDA, or the like. The host processor 202 can be associated with memory module 204, which can include a security processor 206 that can facilitate performing secure operations with regard to data and memory 208. The host processor 202 can be connected in series with the security processor 206 and memory 208 via a shared or split memory bus, such that the security processor 206 is positioned in between the host processor 202 and memory 208 in the series connection.

However, it is to be appreciated that, while the host processor 202, security processor 206, and memory 208 are shown in a series configuration, the disclosed subject matter is not so limited and can be configured in any way that can facilitate the processing of data as claimed and disclosed herein. Further, while, as shown, the host processor 202 arbitrates access to the memory 208 for the host 202 and security processor 206, it is to be appreciated that the disclosed subject matter is not so limited and can be configured in any way that can facilitate the processing of data as claimed and disclosed herein.

The memory 208 can be comprised of one or more partitions 210. Further, the memory 208 can include volatile memory (e.g, RAM, SRAM, and the like) and non-volatile memory (e.g., ROM, PROM, flash, and the like). The partitions 210 can be dynamic, and can be fixed or programmable at run time, and the host processor 202 and security processor 206 can each know to which partition 210 a particular memory location belongs based on the memory address associated with that memory location. In another alternative, the memory space of memory 208 can be dynamically assigned, so that the host processor 202 and security processor 206 can use different addressing with regard to memory 208, as desired.

The memory module 204 can include security software including password authentication software, shared key authentication software, public key infrastructure (PKI) authentication software, integrity check software, encryption/decryption software, anti-virus software, anti-spyware software, secure communication software, and any other type of security software available. The security software can be directly embedded into the memory 208 to provide integrated security capabilities within the memory module 204. Alternatively, some or all of the security software can be embedded in other memory (e.g., ROM 214) situated in security processor 206. The security processor 206 can access the security software from the memory 208 and perform security functions based on the specific security software stored. The security processor 206 can control the entire memory storage and monitor all traffic to and from the memory 208.

The memory module 204 can also provide for authentication services and secure channel communications based on this heightened level of security it has established. Authentication services and secure channel communications can be utilized in a variety of applications to create a secure environment. For example, the memory module 204 can provide security for secure partitioning, secure boot, virus rollback, firmware over the air update (FOTA), near field communication (NFC) secure payment, digital rights management, enterprise remote data management and mobile TV broadcasting.

Authentication services utilized by the memory module 204 can include password authentication, shared key authentication, and PKI authentication, for example. These authentication services can be used in association with three types of authentication. Type 1 is authenticating a user to the secure flash memory, type 2 is authenticating a host processor to the secure flash memory and type 3 is authenticating a server to the secure flash memory. Further, authentication applications may require secure channel communications. The memory module 204 can provide for two types of secure channel communications used in association with the authentication services. Type 1 establishes a secure channel of communication from a host processor to the flash memory and type 2 establishes a secure channel of communication from a back end server to the flash memory.

The security processor 206 can include a processing component 212, which can be an application processor, for example. The processing component 212 can provide a secure environment to implement authentication algorithms and security software. However, as described infra, the timing associated with the reading or writing of data to the memory 208 by the security processor 206 typically can be derived from and controlled by the host processor 202. Generally, the processing component 212 can only have control over certain functions associated with the security processor 206 when the host processor 202 is not accessing the memory 208. However, the processing component 212 in the security processor 206 has the ability to independently read or write data using its internal timing as well. For example, the host processor 202 can access the memory 208 via a NOR bus (not shown), while the processing component 212 can access the memory 208 via a NAND bus (not shown), or vice versa.

Processing component 212 can execute various applications that can facilitate and effectuate partitioning of the memory 208, ascertain whether access can be granted to entities requesting access to particular partitions, determine in concert with the host processor 202 whether authentication supplied by a requesting entity comports with corresponding authentication information that can be stored in associated ROM 214, RAM 216, and/or memory component 208, and can facilitate the encryption and decryption of data that is communicated between the host 202 and security processor 206 to ensure against phishing and man-in-the middle attacks, for example. In addition, processing component 212 can configure the cryptographic component 218, discussed in more detail, infra, and can control data flow through security processor 206.

Security processor 206 can also include a host memory I/F 220 that can be associated with system bus 222 and can handle all memory transactions with the host processor 202. It is to be understood that while security processor 206 is shown with one system bus 222, in an alternative embodiment, security processor 206 can have more than one system bus 222 (only one bus shown) and the components of the security processor 206 may or may not be connected to a particular system bus 222 of the one or more system busses 222. Specifically, the host memory I/F 220 can manage signaling, thus complying with the interface definitions of the memory 208. The host memory I/F 220 also can manage interpreting or differentiating between a secure and non-secure request, and monitoring requests via enforcing access rights and permissions associated with the security processor 206, as described in more detail, infra.

The security processor 206 can include a host buffer 224 that can be associated with the host memory I/F 220 and can hold data associated with secured transactions to and from the host processor 202. The host buffer 224 also can serve as a mailbox between the processing component 212 and the host processor 202, wherein interpretation of the messages is carried out by the processing component 212. The security processor 206 can include a cryptographic component 218 that can be associated with the host buffer 224, memory buffer 226, and system bus 222 and perform all the cryptographic algorithms, symmetric and asymmetric, or the like, needed by the system 200. The cryptographic component 218 can include one or more buffers (not shown) that can be utilized by the cryptographic component 218 when performing its operations. The processing component 212 can configure the cryptographic component 218 and control data flow through the security processor 206. The processing component 212 can interface the system bus 222 and the security applications that run on the processing component 212, arbitrating with the host processor 202. The security processor 206 can also include a memory buffer 226 that can be associated with the system bus 222 and cryptographic component 218, and can hold data associated with secured transactions as the data proceeds to and from the memory 208. Further, the security processor 206 can include a memory I/F 228 that can be associated with the system bus 222 and memory buffer 226, and can handle all transactions to and from the memory 208 and the security processor 206, such as signaling and interpretation.

As stated, the security processor 206 can include a host memory I/F 220 that can monitor bus traffic, such as commands, data, and other information, between the host processor 202 and memory 208 to provide improved security capabilities. For example, the host memory I/F 220 can monitor commands generated by the host processor 202 that can be received by the security processor 206 via the host memory I/F 220. The host memory I/F 220 can analyze the command, including the type of command (e.g., read, write, program, erase), the memory location in the memory 208 to which the command is directed, and whether the command is valid or invalid, for example. If the command is illegal or invalid, the host memory I/F 220 can abort the command and prevent the command from executing in the memory. Further, the host memory I/F 220 and the memory 208 can each revert to an idle state, so that their respective state machines remain in corresponding states, thereby enabling the host memory I/F 220 and memory 208 to work in sequence together. Alternatively, an illegal or invalid command can be prevented by locking out the memory 208 until it (with or without the security processor 206) has gone through a power off/on cycle. If the command is valid, the host memory I/F 220 can also monitor the command to see whether the command is directed to a memory location in the memory 208 to which the command is permitted to have access.

The security processor 206 can employ the processing component 212 to receive and retrieve authentication information (e.g., biometric information and/or password information) associated with an entity attempting to access one or more memory partitions. The authentication information can be used to determine which memory partitions, and thus, which memory addresses, in the memory 208 that the entity has authority to access.

For example, the authentication information can be compared to authentication rights stored in the memory module 204. During the boot routine, information associated with the authentication rights can be read out of a highly secure partition in the memory 208, or other memory (e.g., ROM 214) in the security processor 206, by the security processor 206, and can only be read out of the memory 208, or other memory in the security processor 206, by the security processor 206. The authentication rights information can then be received by the security processor 206 via the memory I/F 228 and stored in the RAM 216 in the security processor 206, for example. Thereafter, the authentication rights information can be transferred and stored in registers (not shown) located in the security processor 206. While in the security processor 206, the host memory I/F 220 can utilize that information to assist in the determination of what access rights may be granted to a requesting entity that has issued a command(s).

If the command is to a partition to which the command is granted access, that is, if proper authentication has been presented with regard to that memory partition, the partition will be "open" and the command can be executed. If the command is to a memory partition to which access rights have not been granted, that partition will be "closed" or "locked" and the host memory I/F 220 can see that there is a command partition violation. The host memory I/F 220 can then act accordingly to prevent the operation associated with the command from executing in the memory 208. At the same time, to ensure that the memory 208 and other components continue to operate smoothly, the host memory I/F 220 can perform a different operation, such as, for example, sending replacement data to the memory location in the partition, where the data can be such that the information in that memory location will not be affected.

For example, the host memory I/F 220 can generate a unique command that can be sent to the memory 208, so the attempted command sequence can be aborted, in a sense. Further, the unique command can cause the memory 208 to go to a known state. The unique data sent to the memory 208 can cause the current illegal operation to abort and/or do nothing and/or it may cause the memory 208 to go to an idle state and/or cause an operation to be performed in the memory 208, but with no change to the data in the memory location. In any event, it can cause the memory device 208 to not execute the entity's attempted command, as the improper operation is essentially "masked" out.

The security processor 206 can further employ a bypass component 230 that can be associated with the system bus 222, host memory I/F 220, and memory I/F 228, and when selected or enabled can allow data and other information to flow through the security component via a bypass bus associated with bypass component 230, so the host processor 202 can access the memory 208 directly without any processing or interference by the security processor 206. The bypass component 230 can be a co-processor, for example, such as a simple co-processor that is able to receive memory address data, and select or enable the bypass mode when the memory address in the read/write cycle is associated with the host processor 202, or de-select or disable the bypass mode when the memory address is associated with the security processor 206. Further, in an alternative embodiment, bypass component 230 can be included in the host memory I/F 220. In the bypass mode, the security processor 206 is essentially "transparent" to the host processor 202 and memory 208, as the data and other information flows via the shared or split bus to/from the host processor 202, through the security processor 206, via, for example, the bypass bus associated with bypass component 222 and from/to the memory 208 via the memory bus associated therewith. For example, the bypass component 230 can be selected or enabled to put the security processor 206 into bypass mode when the host processor 202 is performing memory reads or writes associated with the host processor 202 that involve instructions, or data or other information that are not secured, such as with regard to application programs, etc.

When the bypass component 230 is de-selected or not enabled, the security processor 206 can access the memory 208 via a memory bus. However, it is to be appreciated that, in one embodiment, the memory 208 can include a NOR device (not shown) and a NAND device (not shown). For example, the NOR device can be associated with a NOR memory bus (not shown) that can be associated with the memory I/F 228, and on the host end, a NOR host bus (not shown) that can be associated with the host processor 202 and host memory I/F 220. Further, the NAND device can be associated with a NAND memory bus (not shown) that can be associated with the memory I/F 228, and on the host end, a NAND host bus (not shown) that can be associated with the host processor 202 and host memory I/F 220. In one aspect of the disclosed subject matter, on the host end, the NOR and NAND can utilize a shared bus (e.g., many signals have common connections) situated between the host processor 202 and the host memory I/F 220, as opposed to a split bus (e.g., no signals are shared).

Further, when the bypass component 230 is de-selected or not enabled, it is to be understood that, typically, the host processor 202 can still provide the signal timing to both the security processor 206 and memory 208 to control access of the security processor 206 to the memory bus, and thus the memory 208, although the processing component 212 can operate with memory I/F 228 to execute certain read or write commands to the memory 208, for example. It should be noted that one example where the host processor 202 does not provide signal timing is during the boot process, where the processing component 212 can access data from the memory 208 independent from the host processor 202. Thus, the host processor 202 can have significant control as to when data is moved in/out of the memory 208 from/to the security processor 206, as well as moved between internal components (e.g., cryptographic component 218, memory buffer 226) of the security processor 206. An aspect of the claimed subject matter is that the host processor 202 can "move" data to and from the memory 208 without the host processor 202 actually making a copy of the memory data. This architecture can thereby enhance the security of the system as well as simplify the design of the interface.

Figure 3:
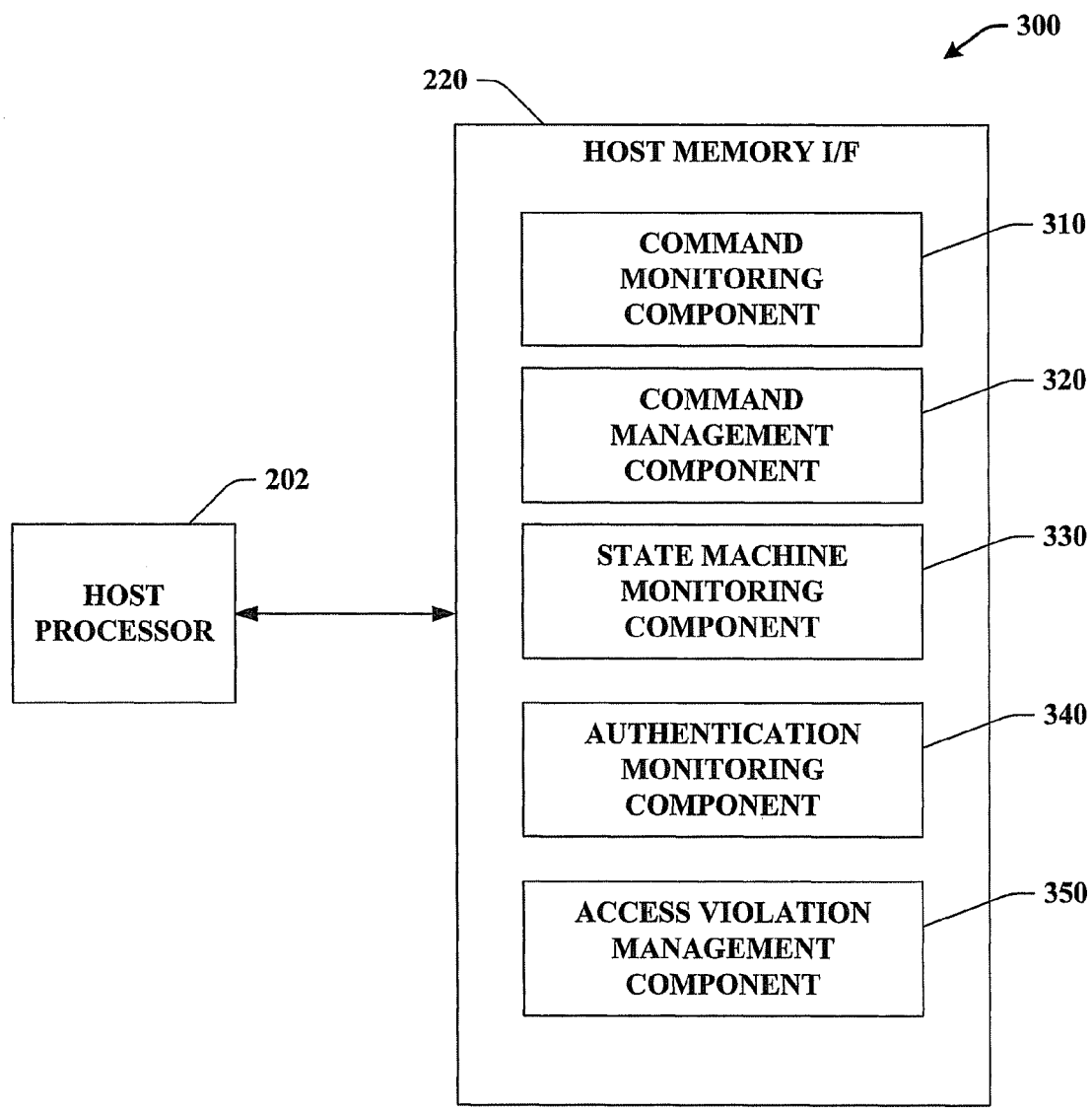
FIG. 3 provides a more detailed depiction of a host memory interface in accordance with another aspect of the disclosed subject matter.

FIG. 3 provides a more detailed illustration 300 of the host memory I/F 220 in more detail in accordance with the disclosed subject matter. The host memory I/F 220 can include a command monitoring component 310 that can monitor commands generated by the host processor 202. For example, the command monitoring component 310 can monitor an incoming command to determine whether the command is valid or not. Host memory I/F 220 can also include a command management component 320 that can prevent an invalid command from executing on the memory 208 (not shown). For example, if a command, such as a command that is part of a command sequence, is invalid, the command management component 320 can, in effect, cause the invalid command to abort, and send the host memory I/F's 220 state machine to go back to an idle state as well as send the memory's 208 state machine back to an idle state, thereby keeping the host memory I/F 220 and memory 208 in corresponding states so that they can act in concert with each other and not be out of sequence with each other. The state machine monitoring component 330 can monitor the state machine of the memory 208 to ensure that the state machine of the host memory I/F 220 and the state machine of the memory 208 are synchronized. Host memory I/F 220 can further include an authentication monitoring component 340 that can monitor whether authentication has been given, and if so, what level of authentication has been given. The authentication can be utilized to determine the partitions of the memory 208 to which the command has been granted access rights. Host memory I/F 220 can also include an access violation management component 350 that can manage any command partition violations that occur. For example, if there is no command partition violation, that is, if proper authentication has been given granting access rights to the particular partition to which the command is directed, and the command is valid, as determined by the command monitoring component 310, then the command can proceed through the security processor 206 (not shown) via the system bus 222. If a command partition violation is found by the access violation management component 350, then the access violation management component 350 can prevent the command from executing in the memory 208.

For example, the access violation management component 350 can cause replacement data to be sent instead of the data attempted to be sent via the improper command. With regard to a write command that violates partition access rights, the replacement data can be such that when it is sent to the memory location, it will result in no change to the data in the memory location. In another example, the replacement information can result in a different location in memory being specified, as opposed to the memory location that the illegal command was attempting to access, thereby preventing the illegal command from changing the data in the memory location specified by the illegal command. The different memory location can be a location in memory utilized to receive data associated with illegal commands, for example. As a further example, with regard to a read command that violates partition access rights, the access violation management component 350 can prevent the reading of data from the specified memory location and instead can send replacement data to the host processor, for example. This replacement data will not be valid useable data. By preventing the improper operation from executing, but still allowing a replacement operation to go forward in its place, the state machine of the host memory I/F 220 and the state machine of the memory 208 can continue in sequence so that the device can continue to operate without interruption.

Figure 4:
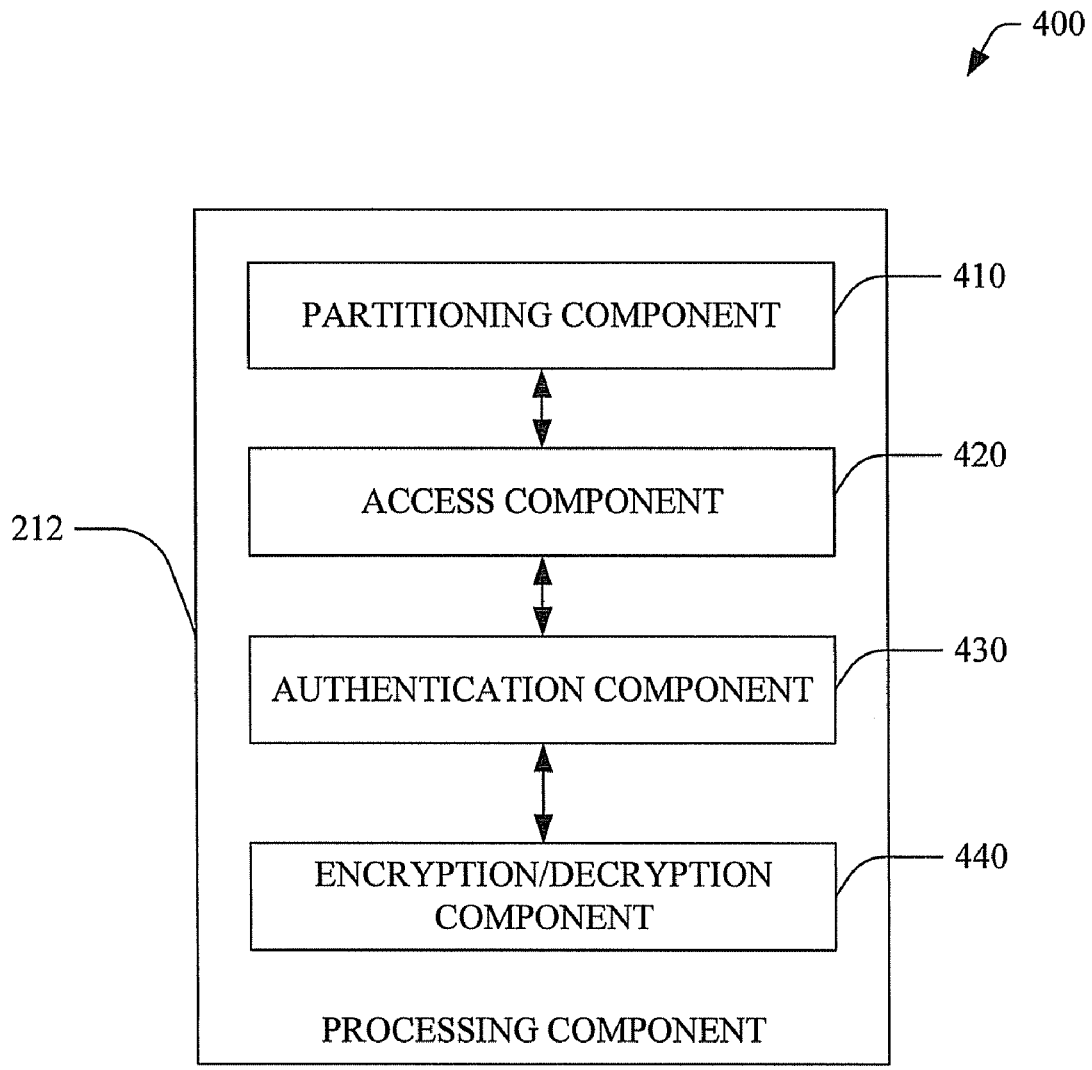
FIG. 4 provides a more detailed depiction of a processing component in accordance with another aspect of the disclosed subject matter.

FIG. 4 provides a more detailed depiction 400 of processing component 212. Illustrated therein processing component 212 can include a partitioning component 410 that can facilitate and effectuate partitioning of memory 208, an access component 420 that can ascertain and determine in concert with associated ROM 214 and/or RAM 216 and one or more internal registers (not shown) associated with memory module 204 whether or not an entity attempting to access a particular partition has been assigned, or has appropriate, access rights to be granted access to that partition, an authentication component 430 that can elicit sufficient authentication information from an entity to ensure the identity of the entity requesting access to a particular partition, and an encryption/decryption component 440 that can facilitate the encryption/decryption of data communicated between the host processor 202 and the security component 206.

Partitioning component 410 can divide the memory component 208 into multiple partitions 210. A partition can be created by specifying an identifier (e.g., GUID) that can be associated with the location of the memory component 208, the start address from whence the partition 210 should commence, and an end address within the memory component 208. Since a created partition 210 can typically span over multiple erase units the start and end addresses can be rounded to erase units. Moreover, since a partition 210 can typically exist in one of two states, "open" or "closed", partitioning component 410 can, upon appropriate command being issued, change the state. Thus, where a partition 210 is in an "open" state, partitioning component 410 can, upon receipt of a command and with proper authentication, close the partition. Conversely, where a partition is set to a "closed" state, partitioning component 410 can place the partition in an "open" state upon receipt of an appropriate command and with proper authentication.

Access component 420 can assign and determine access types and rights to partitions created by partitioning component 410. Typically access types that can be assigned by the access component 420 to a partition can include, but are not limited to, "read", "write", and "change access right". Further, access component 420 can also assign and ascertain access permissions associated with a partition. Access permissions can include one of: "ALWAYS, WHEN_OPEN, WITH_PKI, or WHEN_OPEN_OR_WITH PKI", wherein access permission "ALWAYS" indicates that access to a partition is always allowed, "WHEN_OPEN" indicates that access to the partition is allowed only when a partition is in an "open" state, "WITH_PKI" denotes that access to a partition is permitted only when appropriate PKI authentication information has been supplied, and "WHEN_OPEN_OR_WITH PKI" connotes that access is allowed when a partition is in an "open" state or when appropriate PKI authentication information has been supplied.

In addition, access component 420 can further set partition attributes on the "change access right" access type to: "ALWAYS", "WITH_PASSWORD", "WITH_PKI", and "WITH_PASSWORD_OR_WITH_PKI", wherein a "change access right" attribute set to "ALWAYS" is indicative that access rights on a partition can always be changed, "WITH_PASSWORD" denotes that access rights can only be changed when an appropriate password is supplied by the entity requesting the change, "WITH_PKI" indicates that access rights to the partition can only be changed when appropriate PKI authentication information is supplied by the entity requesting the change, and "WITH_PASSWORD_OR_WITH_PKI" requires that the entity requesting the access change supply either an appropriate password or relevant PKI authentication information.

Authentication component 430 can receive and retrieve credential information (such as biometric information and/or password information) associated with an entity attempting to access one or more memory partitions. In addition authentication component 430 can manage and maintain credential information which can be stored in associated ROM 214 and/or RAM 216, and/or alternative such credential information can also be stored in one or more of the memory component 208. In addition to merely receiving credential information, authentication component 430 can also solicit additional credential information where the authentication component 430 deems such information may be necessary to appropriately establish the identity of the entity seeking access to a particular partition. Upon receipt of credential information from an entity, authentication component 430 can consult with stored credential information (e.g., in associated ROM 214, RAM 216, and/or memory component 208), and, upon identifying a correspondence between the supplied credential information and the stored credential information, can grant and/or indicate to access component 420 the appropriate access that should be accorded to the requesting entity.

Encryption/decryption component 440 can facilitate the utilization of one or more encryption/decryption facilities to ensure that communications between the security processor 206 and the host processor 202 are not compromised by one of the many malicious extant viruses. The encryption/decryption component 440 can utilize one or more encryption/decryption mechanisms to obscure data communicated between security processor 206 and the host processor 202. Examples of encryption/decryption mechanisms that can be employed to obscure the data can include utilization of hashing algorithms, public key encryption, elliptic curve encryption, and the like.

Figure 5:
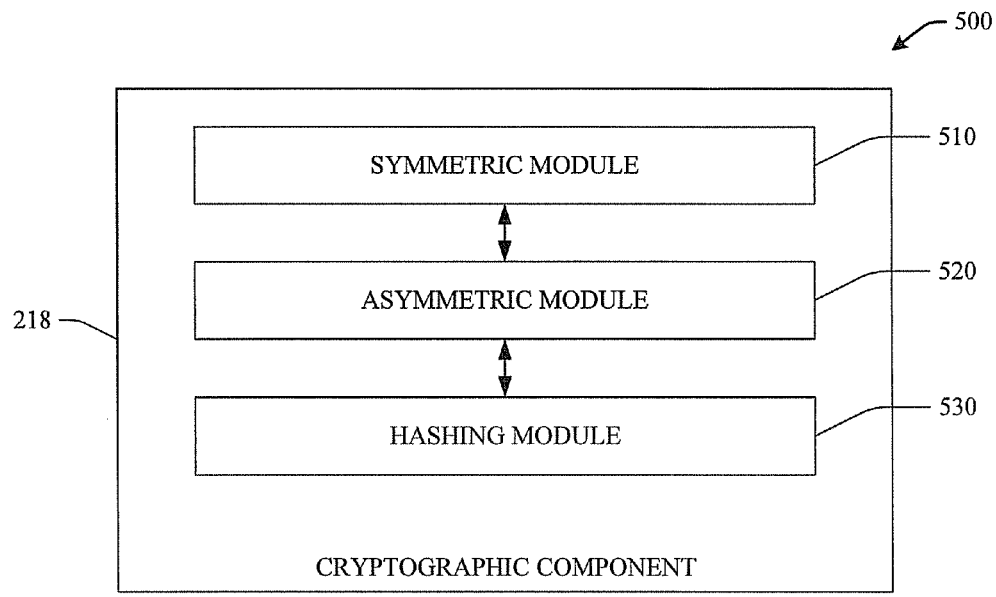
FIG. 5 provides a more detailed block diagram of a cryptographic component that can be included with an aspect of the disclosed subject matter.

FIG. 5 provides a more detailed illustration 500 of cryptographic component 218. As illustrated, cryptographic component 218 can include symmetric module 510 that provides symmetric cryptographic tools and accelerators (e.g., Twofish, Blowfish, AES, TDES, IDEA, CAST5, RC4, etc.) to ensure that a specified partition in memory component 208, or portions thereof, can only be accessed by those entities authorized and/or authenticated to do so. Cryptographic component 218 can also include asymmetric module 520 that provides asymmetric cryptographic accelerators and tools (e.g., Diffie-Hellman, Digital Signature Standard (DSS), Elliptical Curve techniques, RSA, IKE, PGP, and the like) to ensure that a specified partition in memory component 208, or portions thereof, are only accessed by those entities that are authorized and certified to do so. Additionally, cryptographic component 218 can include hashing module 530 that, like symmetric module 510 and asymmetric module 520, can provide accelerators and tools (e.g., Secure Hash Algorithm (SHA) and its variants such as, for example, SHA-0, SHA-1, SHA-224, SHA-256, SHA-384, and SHA-512) to ensure that access to the specified partition in memory 208 is confined to those entities authorized to gain access.

Figure 6:
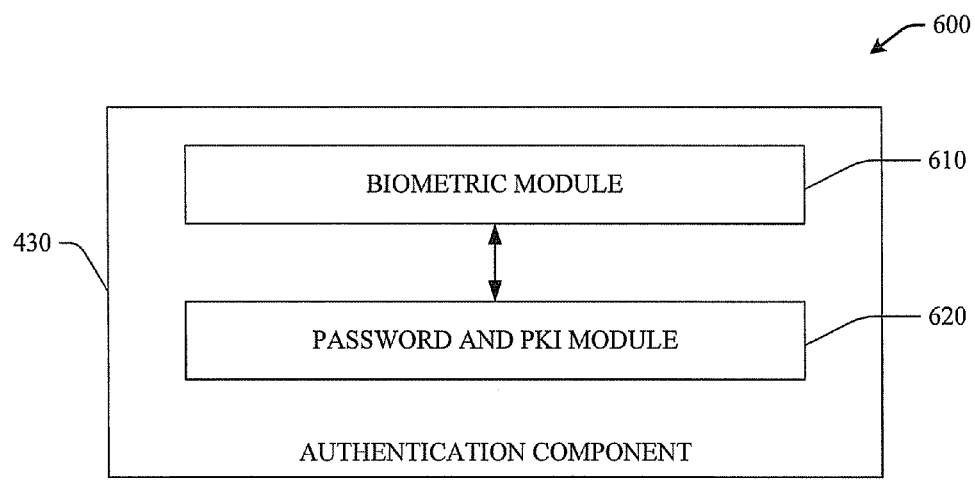
FIG. 6 provides a more detailed depiction of an authentication component in accordance with the disclosed subject matter.

FIG. 6 provides a more detailed depiction 600 of authentication component 330. Authentication component 430 can include a biometric module 610 and password and PKI module 620. Biometric module 610 can implement one or more machine implemented methods to identify an entity by its unique physical and behavioral characteristics and attributes. Biometric modalities that can be employed by biometric module 610 can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

Password and PKI module 620 can solicit authentication data from an entity, and, upon the authentication data so solicited, can be employed, individually and/or in conjunction with information acquired and ascertained by the biometric module 610, to control access to memory 208. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like. Additionally and alternatively, PKI data can also be employed by password and PKI module 620. PKI arrangements provide for trusted third parties to vet, and affirm, entity identity through the use of public keys that typically are certificates issued by the trusted third parties. Such arrangements enable entities to be authenticated to each other, and to use information in certificates (e.g., public keys) to encrypt and decrypt messages communicated between entities.

Figure 7:
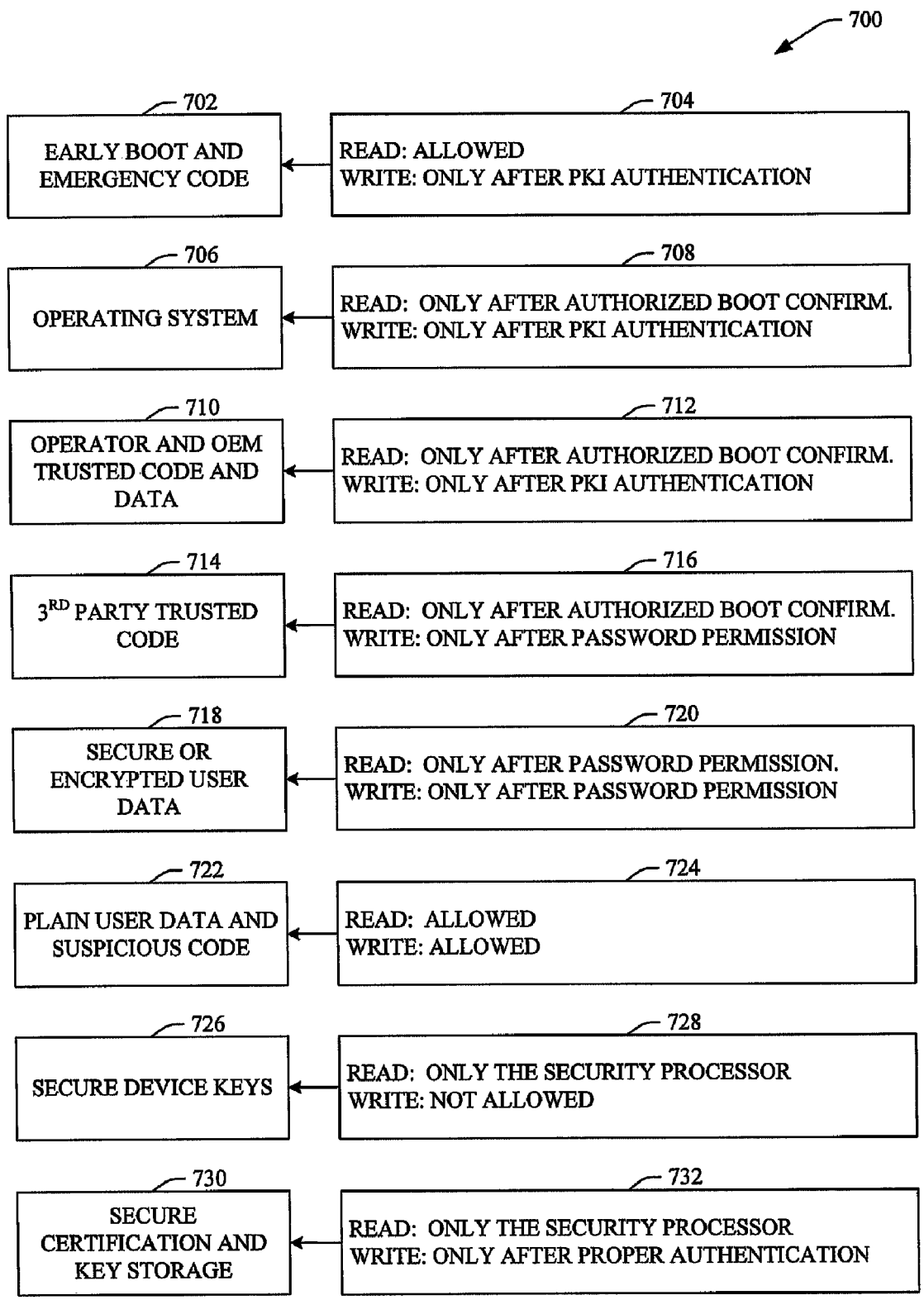
FIG. 7 illustrates a diagram of a partitioned memory in accordance with an aspect of the disclosed subject matter.

For example, FIG. 7 illustrates secure memory partitions 700 of a memory. The memory 208 can be non-volatile memory, such as flash memory, for example. Secure Partitioning can be utilized to protect essential data and code, secure sensitive information, and allow easy access to common public data. Secure Partitioning can allow separate access controls to different partitions of data which can be made available based on user, service provider, original equipment manufacturer (OEM), enterprise authentication, or any other type of authentication available. More specifically, as illustrated in FIG. 7, the memory space can be divided into multiple partitions with associated access rights. The access rights can distinguish between read and write (or erase) permissions. The access rights can also include the ability to change access rights as permissions are granted and/or denied, so that multiple users who have access rights to a shared partition can all access the shared partition.

Further, the access rights can support different security levels of authentication. Accordingly, some objects can utilize higher levels of protection than others. For example, the partition that stores the operating system can be protected more securely than a partition that stores a downloaded game. The access rights can also support remote users who do not assume that the host is trusted. Authentication of a remote user must work correctly even if the host is not trusted. In addition to the access rights, partitions can be made inaccessible when an associated mobile handset is not in a trusted state.

As shown in FIG. 7, the memory 700 can be partitioned into eight segments. The memory 700 may be partitioned into as many segments as needed, limited to either software or hardware. Each partition can contain specific read/write (e.g., program or erase) access rights as shown at the right of FIG. 7. Each partition can also contain an access right that specifies an entity that can change the read/write access rights. The memory 700 can be volatile or non-volatile memory (e.g., flash memory), for example.

Specifically, early boot and emergency code 702 includes access rights such that read access can be allowed but write can be allowed only after PKI authentication 704. The operating system 706 can allow read access only after authorized boot confirmation and write access only after PKI authentication 708. The operator and OEM trusted code and data 710 can allow read access only after authorized boot confirmation and write access only after PKI authentication 712. Third party trusted code 714 can allow read access only after authorized boot confirmation and write access only after User Password Permission 716. Secure or encrypted user data 718 can allow read and write access only after user password permission is received 720.

Plain user data and suspicious code 722 can allow read and write access without any security constraints 724. Secure device keys 726 can allow only the security processor (not shown) read access and can prohibit write (or erase) access 728. Secure certification and key storage 730 can allow only the security processor read access and allow write access only after proper authentication 732. The read and write security constraints disclosed in FIG. 7 are just some examples of security constraints that can be applied to the secure memory partitions of the memory, and any security constraints can be applied to the partitions depending on the security access required and/or requested. Furthermore, life-cycle stages can also control the security functionality access. Life-cycle stages include, but are not limited to, the manufacturing stage, development stage, vendor stage, service provider stage, secure (end user) stage and returned materials stage. For example, the life-cycle stages can exhibit a one-way flow wherein anything done on a previous stage is fixed once a stage transition occurs. Further, the main purpose of having life-cycle stages is to provide the flexibility needed during the pre-user stages and at the same time to enforce the security required during the end user stage.

Figure 8:
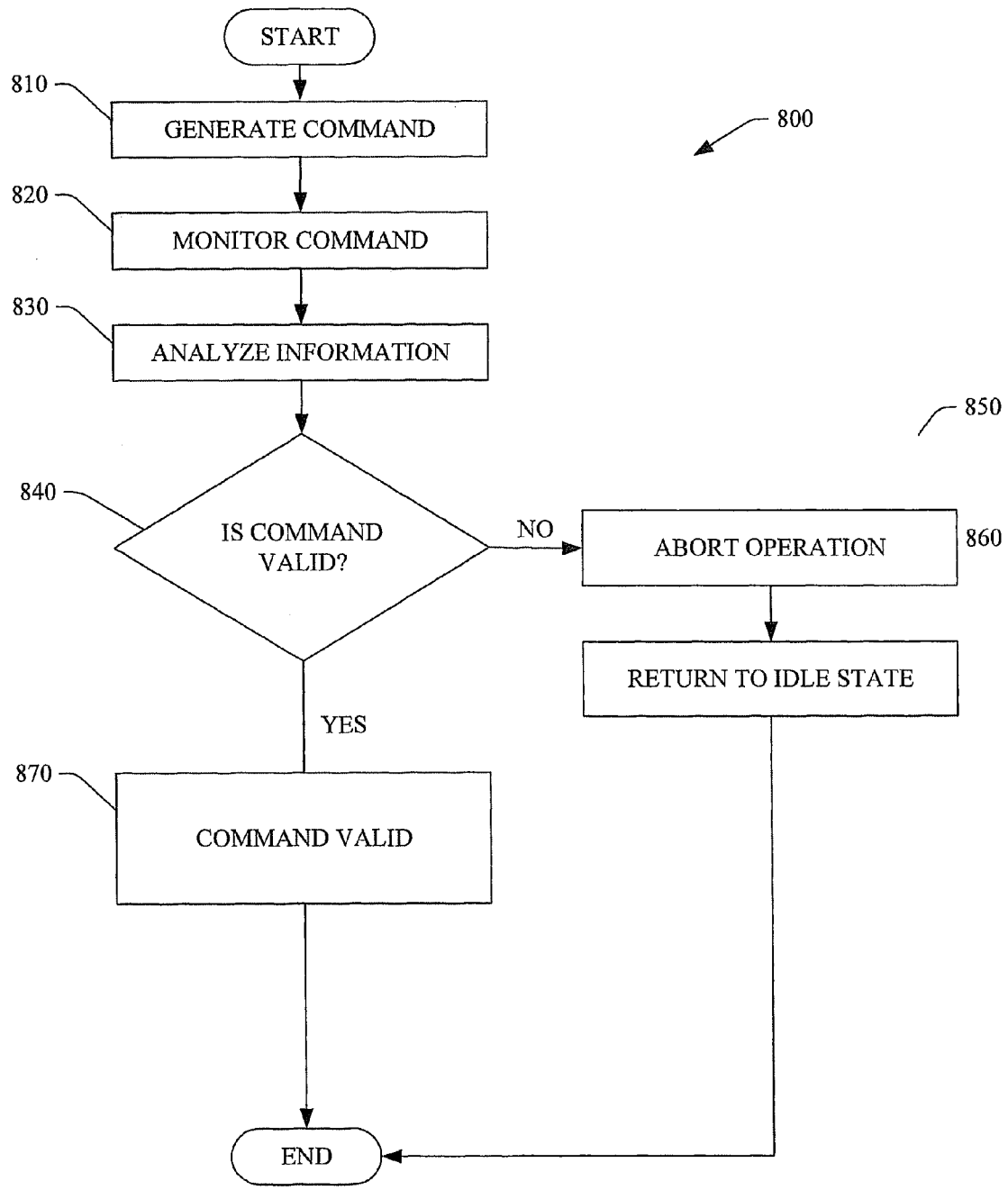
FIG. 8 illustrates a methodology for managing invalid commands in accordance with an aspect of the subject matter disclosed herein.
Figure 9:
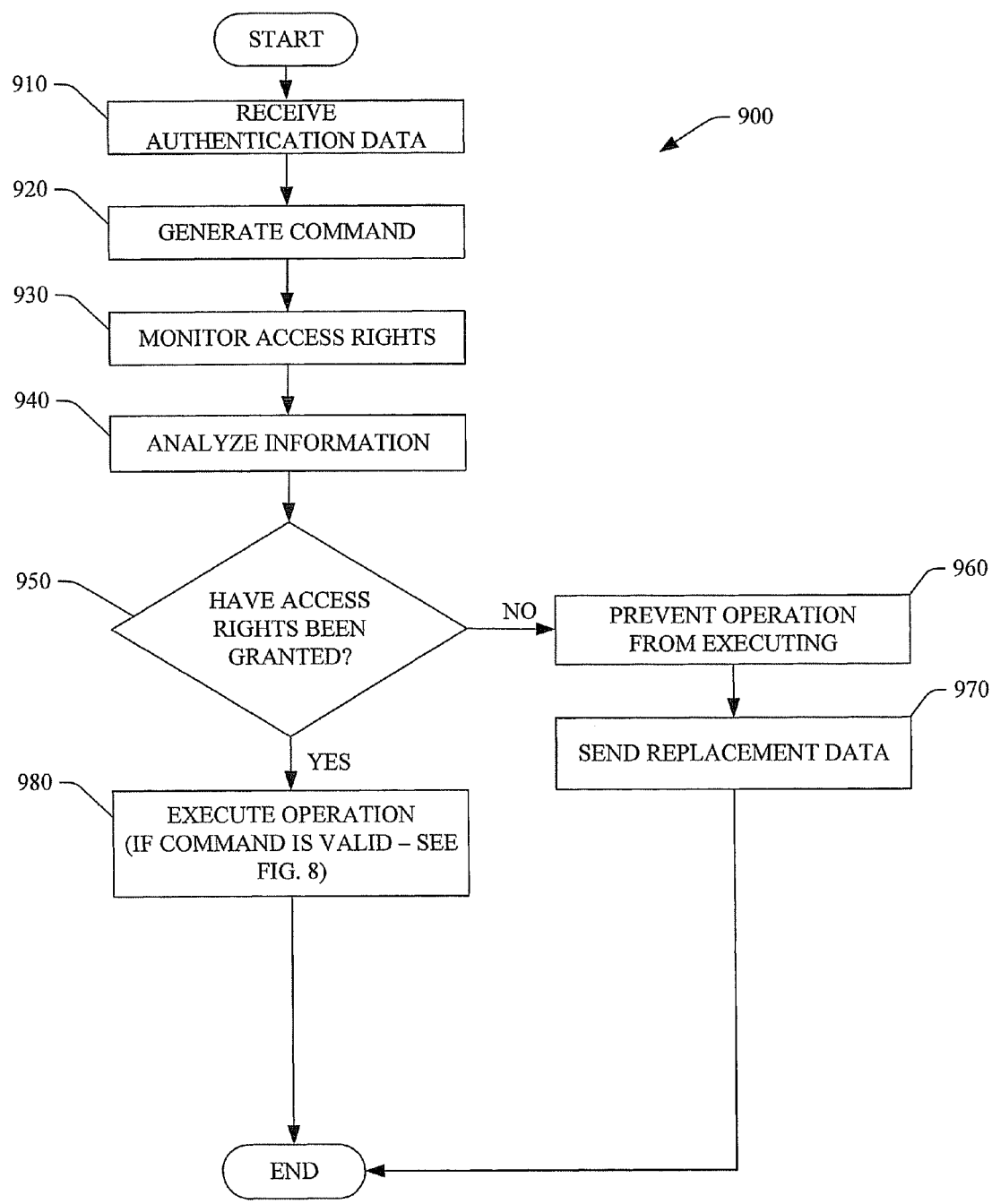
FIG. 9 illustrates a methodology for managing a command partition violation in accordance with an aspect of the subject matter disclosed herein.
Figure 10:
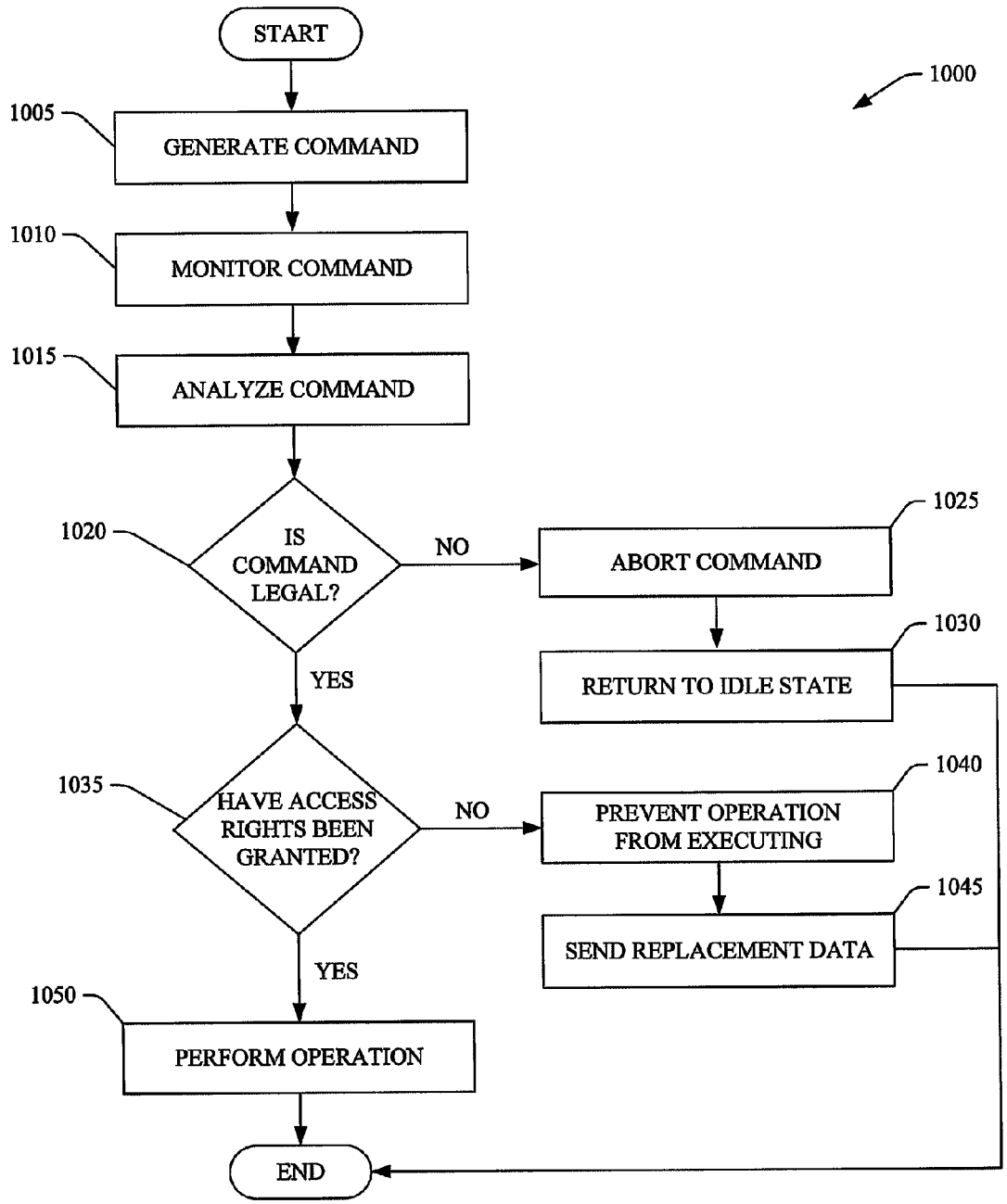
FIG. 10 illustrates a methodology of managing a command violation in accordance with an aspect of the subject matter disclosed herein.

FIGS. 8-10 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 8, a methodology 800 for managing an invalid command in accordance with the disclosed subject matter is illustrated. At 810, a host processor can generate a command. The command can be a read, write, program, or erase, for example. The command can be associated with a memory location in a particular partition in the memory, where the read, write, program, or erase operation is desired to be performed. At 820, the command can be monitored. In one aspect of the disclosed subject matter, a host memory I/F, which can be located in a security processor, can monitor the command. At 830, the host memory I/F can analyze the command and determine what type of command it is, such as a read, write, program, or erase command, and to what memory location in the memory the command is attempting to access, among other information the host memory can retrieve from the analysis. At 840, a determination can be made as to whether the command is legal. If the command is determined to be illegal, then, at 850, the host memory I/F can abort the illegal (invalid) operation. At 860, the host memory I/F and memory can revert to an idle state, where the methodology 800 ends. If the command is determined to be legal, then at 860, the command is valid and can proceed for further analysis without being aborted. At this point, the methodology 800 ends.

Referring now to FIG. 9, a methodology 900 for managing a command partition violation in accordance with the disclosed subject matter is illustrated. At 910, authentication information can be received by a security processor. The authentication information can be stored in the security processor and used to determine what access rights an entity may have with regard to a plurality of partitions in a memory, where the plurality of partitions can have the same or disparate requirements in order to grant access to a respective partition. At 920, a host processor can generate a command. The command can be a read, write, program, or erase, for example. The command can be associated with a memory location in a particular partition in the memory, where the read, write, program, or erase operation is desired to be performed. At 930, the command can be monitored by a host memory I/F in a security processor, for example. At 940, the command can be analyzed to determine what type of command it is, and what partition the command is attempting to access in the memory, among other information that can be learned with regard to the command. At 950, a determination can be made as to whether authentication has been given for the command to access the memory location in the memory partition, as specified with regard to the command. For example, the host memory I/F can analyze the command, and authentication information associated with the requesting entity, to determine whether proper authentication exists, and thus, whether access rights have been granted, with regard to the memory partition to which the command is intending to execute. If proper authentication for access rights to the partition has not been given, then, at 960, the host memory I/F can prevent the operation associated with the command from executing. At 970, the host memory I/F can send replacement data to the specified memory location in the memory. For example, the host memory I/F can prevent the data associated with the improper command from reaching the memory, and can instead send replacement data to the memory, so that an operation will still be performed, but not the improper operation that was being attempted. The replacement data can be such that it will not change any data in the memory array, for example. At this point, the methodology 900 ends. If proper authentication has been given to obtain access rights to the partition, then, at 980, the operation (e.g., read, write, program, or erase) associated with the command can be performed (assuming that the command was a valid command—see FIG. 8 and the discussion related thereto, supra). At this point, the methodology 900 ends.

Referring now to FIG. 10, a methodology 1000 for monitoring a command violation in accordance with the disclosed subject matter is illustrated. At 1005, a host processor can generate a command. The command can be a read, write, program, or erase, for example. The command will be associated with a memory location in a particular partition in the memory, where the read, write, program, or erase operation is desired to be performed. At 1010, the command can be monitored. In one aspect of the disclosed subject matter, a host memory I/F, which can be located in a security processor, can monitor the command. At 1015, the command can be analyzed by the host memory I/F to determine whether the command is a legal or illegal (invalid) command. Further, the host memory I/F can also monitor the command to determine whether proper authentication has been given, and thus, access rights granted, with regard to the memory partition to which the command is to execute. At 1020, a determination can be made as to whether the command is legal or not. If the command is determined to be illegal, then, at 1025, the host memory I/F can abort the command. At 1030, the host memory I/F and memory can go back to an idle state, where the methodology 1000 ends. If the command is determined to be legal, then at 1035, a determination can be made as to whether authentication has been given for the command to access the memory location in the memory partition, as specified with regard to the command. The memory location can be specified by the host processor, for example. If proper authentication for access rights to the partition has not been given, then, at 1040, the host memory I/F can prevent the operation associated with the command from executing. At 1045, the host memory I/F can send replacement data to the memory. For example, the host memory I/F can prevent the data associated with the improper command from reaching the memory, and can instead send replacement data to the memory, so that an operation will be performed, but not the improper operation that was being attempted. The replacement data can be such that it will not change any data in the memory array, for example. At this point, the methodology 1000 would end. If proper authentication is presented resulting in access rights to the partition being given, then, at 1050, the operation associated with the command can be performed. At this point, the methodology 1000 ends.

For example, the host processor can generate a command associated with a single word program operation. The command can be associated with a command sequence. The host memory I/F can monitor the command and command sequence. The host memory I/F may observe that the command is not an illegal command, but further determine that there is a command partition violation, that is, it determines that an attempt is being made to execute the command in a memory partition to which authentication has not been granted. For example, the host memory I/F may observe the command partition violation in one of the commands in the command sequence, such as a command in the sequence that specifies a program address to which authentication has not been granted, as well as specifying the program data desired to be sent to the memory location. The host memory I/F can prevent the command from executing, by sending replacement data to the address in memory instead of the data that was trying to be sent by the command. For example, the replacement data can be such that when it is sent to the memory location it will have no effect on the information in that memory location; the information in the memory location will not be changed.

It is to be appreciated that the memory can include volatile memory (e.g., RAM, SRAM, and the like) and non-volatile memory (e.g., ROM, PROM, flash, and the like).

As utilized herein, terms "component," "system," "module," "interface," and the like are intended to refer to a computer-related entity, either, hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the disclosed subject matter as described herein. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Moreover, the word "exemplary" is used herein to mean serving as an example, instance, or illustration. Any aspect or design described herein as "exemplary" is not necessarily to be construed as preferred or advantageous over other aspects or designs.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 11:
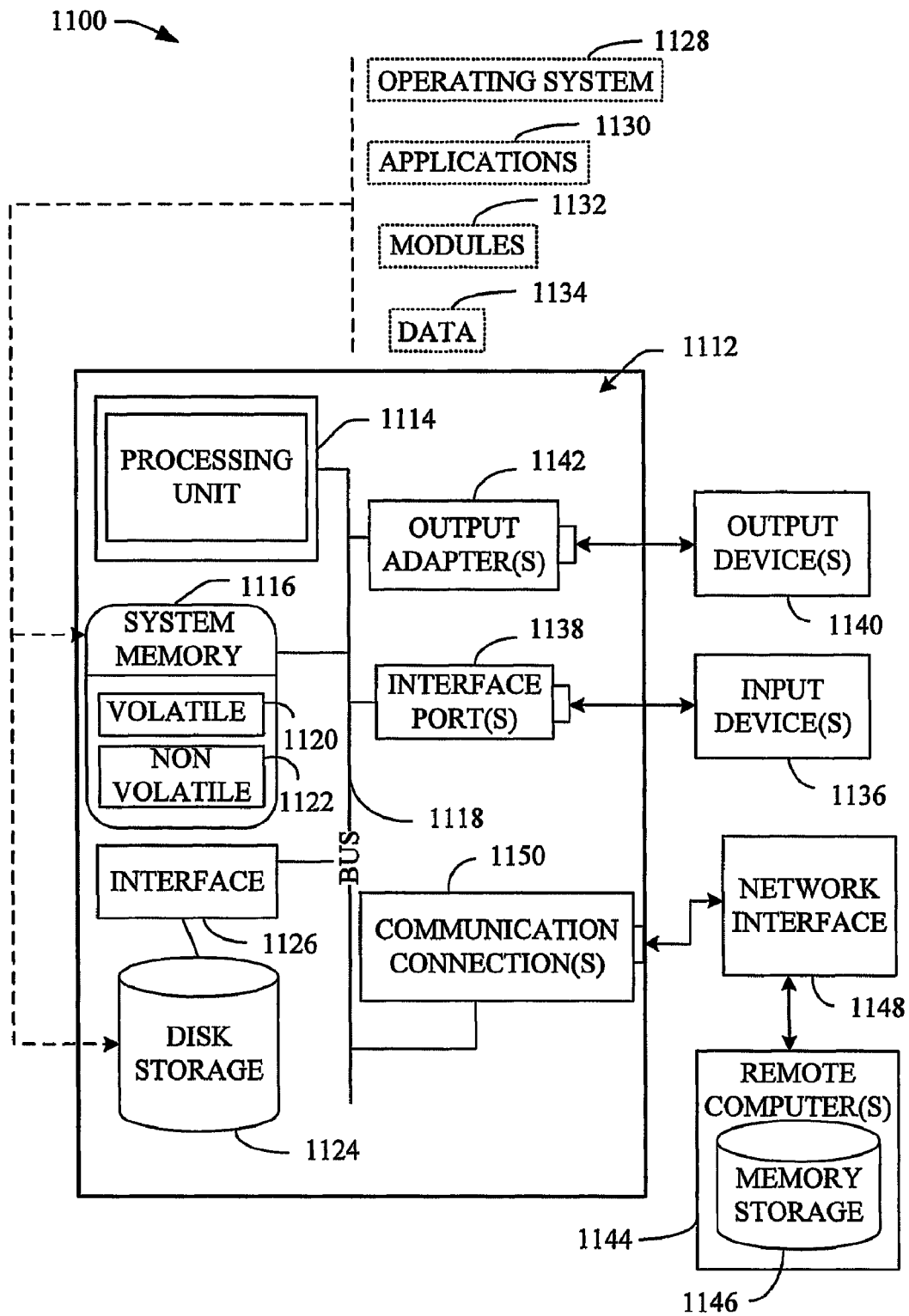
FIG. 11 is a schematic block diagram illustrating a suitable operating environment.
Figure 12:
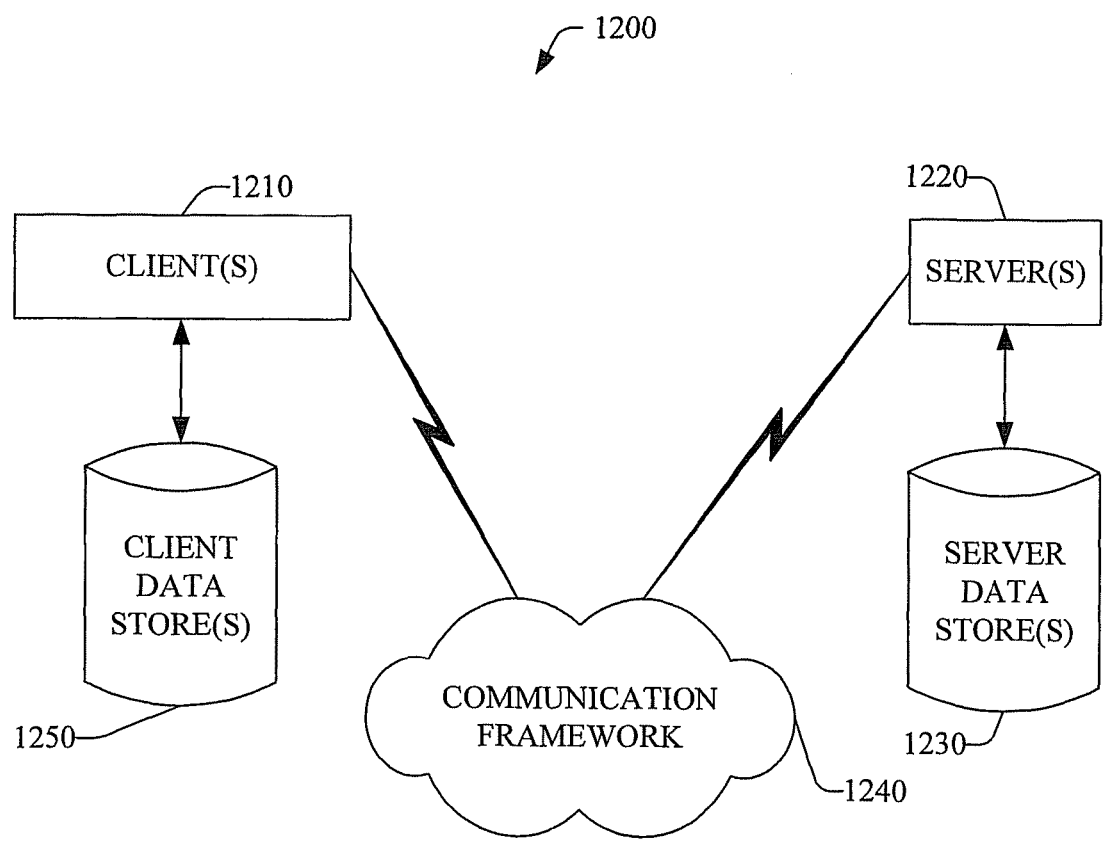
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g. PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 11, a suitable environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include ROM, PROM, electrically programmable ROM (EPROM), electrically erasable programmable ROM (EEPROM), or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that secures information in a memory, comprising:
    a host processor that generates at least one command, the at least one command is at least one of a read, a write, a program, or an erase command; and
    at least one other processor associated with the host processor that receives and analyzes the at least one command, and determines if the at least one command is valid and if the at least one command has access rights to a partition in the memory, the at least one other processor comprises an authentication component that solicits authentication data from an entity and determines access rights to the memory based in part on the authentication data received from the entity, and the at least one other processor controls access to the memory based in part on a level of authentication associated with the authentication data;

the at least one other processor further comprises a host memory interface that monitors information communicated via a bus situated between the host processor and the memory, the host memory interface analyzes the information and determines if the at least one command is valid and if the at least one command has access rights to a partition in the memory, the bus positioned in part in the at least one other processor, the host memory interface aborts the at least one command if it is invalid, and the host memory interface prevents the at least one command from executing an operation in the memory if the at least one command does not have access rights to the partition regardless of the validity of the at least one command.

2. The system of claim 1, the host memory interface executes an operation associated with an alternative command that places the memory in a known state with regard to the system when the at least one command does not have access rights to the partition but the at least one command is valid.

3. The system of claim 2, the known state is at least one of an idle state or a state where the information stored in a memory location associated with the alternative command is not changed after the operation associated with the alternative command is executed.

4. The system of claim 1, the at least one other processor allows the at least one command to execute an operation in the memory if the at least one command is valid and access rights to the partition have been granted.

5. The system of claim 1, the memory is at least one of volatile memory or non-volatile memory.

6. The system of claim 5, the non-volatile memory is at least one of flash memory, read only memory, or programmable ROM.

7. The system of claim 1, the at least one other processor is implemented as a state machine and the memory is implemented as a state machine and the respective state machines are synchronized.

8. A system that secures information in a memory, comprising:

a host processor that generates at least one command, the at least one command is at least one of a read, a write, a program, or an erase command; and at least one other processor associated with the host processor that receives and analyzes the at least one command, and determines if the at least one command is valid and if the at least one command has access rights to a partition in the memory, the at least one other processor is implemented as a state machine and the memory is implemented as a state machine and the respective state machines are synchronized;

the at least one other processor comprises a host memory interface that monitors information communicated via a bus situated between the host processor and the memory, the host memory interface analyzes the information and determines if the at least one command is valid and if the at least one command has access rights to a partition in the memory, the bus positioned in part in the at least one other processor, the host memory interface aborts the at least one command if it is invalid, the host memory interface prevents the at least one command from executing an operation in the memory if the at least one command does not have access rights to the partition regardless of the validity of the at least one command, and the host memory interface executes an operation associated with an alternative command that places the memory in a known state with regard to the system when the at least one command does not have access rights to the partition but the at least one command is valid.

9. The system of claim 8, the known state is at least one of an idle state or a state where the information stored in a memory location associated with the alternative command is not changed after the operation associated with the alternative command is executed.

10. The system of claim 8, the at least one other processor allows the at least one command to execute an operation in the memory if the at least one command is valid and access rights to the partition have been granted.

11. The system of claim 8, the memory is at least one of volatile memory or non-volatile memory.

12. A system that secures information in a memory, comprising:

a host processor that generates at least one command, the at least one command is at least one of a read, a write, a program, or an erase command; and at least one other processor associated with the host processor that receives and analyzes the at least one command, and determines if the at least one command is valid and if the at least one command has access rights to a partition in the memory, the at least one other processor comprises a host memory interface that monitors information communicated via a bus situated between the host processor and the memory, the host memory interface analyzes the information and determines if the at least one command is valid and if the at least one command has access rights to a partition in the memory, the bus positioned in part in the at least one other processor, the host memory interface aborts the at least one command if it is invalid, the host memory interface prevents the at least one command from executing an operation in the memory if the at least one command does not have access rights to the partition regardless of the validity of the at least one command, and the host memory interface executes an operation associated with an alternative command that places the memory in a known state with regard to the system when the at least one command does not have access rights to the partition but the at least one command is valid.

13. The system of claim 12, the known state is at least one of an idle state or a state where the information stored in a memory location associated with the alternative command is not changed after the operation associated with the alternative command is executed.

14. The system of claim 12, the memory is at least one of volatile memory or non-volatile memory.

* * * * *